United States Patent
Tulloch et al.

(10) Patent No.: US 11,047,418 B2
(45) Date of Patent: Jun. 29, 2021

(54) FASTENER LOCKING

(71) Applicant: AIRBUS OPERATIONS LIMITED, Bristol (GB)

(72) Inventors: William Tulloch, Bristol (GB); Pat Broomfield, Bristol (GB)

(73) Assignee: Airbus Operations Limited, Bristol (GB)

( * ) Notice: Subject to any disclaimer, the term of this patent is extended or adjusted under 35 U.S.C. 154(b) by 210 days.

(21) Appl. No.: 16/281,470

(22) Filed: Feb. 21, 2019

(65) Prior Publication Data
US 2019/0257349 A1    Aug. 22, 2019

(30) Foreign Application Priority Data

Feb. 21, 2018    (GB) ..................................... 1802776

(51) Int. Cl.
*F16B 39/10*    (2006.01)
*F16B 41/00*    (2006.01)

(52) U.S. Cl.
CPC ............ *F16B 39/10* (2013.01); *F16B 41/002* (2013.01)

(58) Field of Classification Search
CPC ............................... F16B 41/002; F16B 39/10
USPC ....... 411/120, 130, 131, 197, 200, 217, 219, 411/974; 70/229, 230, 231
See application file for complete search history.

(56) References Cited

U.S. PATENT DOCUMENTS

| | | | | |
|---|---|---|---|---|
| 606,582 A | * | 6/1898 | Rohlin ..................... | F16B 39/04 403/14 |
| 642,718 A | * | 2/1900 | Redon ..................... | F16B 39/10 411/91 |
| 767,099 A | * | 8/1904 | Bertolett | |
| 1,088,515 A | | 2/1914 | Bazin | |
| 1,741,077 A | * | 12/1929 | Rusack ................... | F16B 39/10 411/91 |
| 2,409,907 A | | 10/1946 | Shakesby et al. | |
| 3,493,026 A | | 2/1970 | Donofrio et al. | |
| 4,274,754 A | * | 6/1981 | Cohen ..................... | F16B 39/04 403/14 |
| 2009/0116930 A1 | | 5/2009 | Reimler | |
| 2009/0167074 A1 | | 7/2009 | De Lima | |
| 2010/0054894 A1 | | 3/2010 | Caballero Asensio et al. | |

FOREIGN PATENT DOCUMENTS

| | | |
|---|---|---|
| CN | 103498856 | 8/2015 |
| GB | 1065822 | 4/1967 |
| WO | 2005/093269 | 10/2005 |

OTHER PUBLICATIONS

Combined Search and Examination Report for GB1802776.3, dated Mar. 27, 2018, 6 pages.
European Search Report cited EP 19156824.5 dated Jul. 4, 2019, 7 pages.

* cited by examiner

*Primary Examiner* — Gary W Estremsky
(74) *Attorney, Agent, or Firm* — Nixon & Vanderhye P.C.

(57) ABSTRACT

A locking apparatus for locking the rotational position of a fastener component which is rotatable about an axis relative to a structure. The locking apparatus includes a rigid locking member having a first end configured to engage with the fastener component such that rotation of the fastener component relative to the first end is substantially prevented, and a second end configured to engage with the structure such that rotation of the locking member relative to the structure is substantially prevented.

19 Claims, 6 Drawing Sheets

FASTENER LOCKING

RELATED APPLICATION

This application claims priority United Kingdom Patent Application GB 1802776.3, filed 21 Feb. 2018, the entire contents of which is incorporated by reference.

TECHNICAL FIELD

The present invention relates to a locking apparatus for locking the rotational position of a fastener component which is rotatable about an axis relative to a structure, to an assembly comprising a fastener and a locking apparatus, and also to a method of locking the rotational position of a fastener component.

BACKGROUND

Rotatable fastener components such as nuts and bolts may loosen when subjected to vibration. Fasteners on vehicles such as aircraft may experience significant vibration during operation of the vehicle, so it is desirable to provide mechanisms for locking the rotational positions of such fasteners. Known locking mechanisms include split pins, which are suitable for locking together two relatively rotatable parts of a fastener (such as a nut and a bolt), and safety wire, which is attached at one end to a rotatable fastener part and at the other end to another part of the fastener or to another structure.

Various drawbacks exist in respect to conventional fastener locking mechanisms. For example, split pins are not generally suitable for locking a fastener component to a further structure, and require a hole to be created through the fastener components that are to be locked together, after the fastener has been installed and tightened. This is difficult or impossible for many fastener arrangements. Safety wire can be used in more situations, but it is impractical for very large, highly loaded fasteners. Moreover, the correct installation of safety wire requires considerable skill, and can be difficult to perform where access to the fastener is restricted.

In view of these drawbacks, an improved fastener locking mechanism is desired.

SUMMARY

A first aspect of the present invention provides a locking apparatus for locking the rotational position of a fastener component which is rotatable about an axis relative to a structure. The locking apparatus comprises a rigid locking member having a first end configured to engage with the fastener component such that rotation of the fastener component relative to the first end is substantially prevented, and a second end configured to engage with the structure such that rotation of the locking member relative to the structure is substantially prevented.

Optionally, the fastener component comprises at least a part of a fastener for fastening the structure to a further structure.

Optionally, the fastener component has a finite order of rotational symmetry about the axis.

Optionally, the first end comprises an engagement surface configured to mechanically interlock with an outer surface of the fastener component. Optionally, the engagement surface is configured to mechanically interlock with the outer surface of the fastener component in a plurality of rotational positions of the fastener component relative to the locking member.

Optionally, the first end is configured to at least partially encircle the fastener component. Optionally, at least a section of the fastener component has a non-circular cross-section and/or at least one radially-extending projection, and the first end is configured to at least partially encircle a section of the fastener component having a non-circular cross-section and/or at least one radially-extending projection.

Optionally, the second end is configured to be fixedly attachable to the structure in a plurality of rotational positions of the locking member relative to the structure.

Optionally, the locking apparatus further comprises a secondary locking member for locking the rotational position of a further fastener component which is rotatable about the axis relative to the fastener component. The secondary locking member comprises a first part configured to engage with the locking member such that rotation of the secondary locking member relative to the locking member is substantially prevented; and a second part configured to engage with the further fastener component such that rotation of the further fastener component relative to the secondary locking member is substantially prevented.

Optionally, the locking member is configured to be in simultaneous engagement with the fastener component and with the secondary locking member.

Optionally, an engagement surface of one of the locking member and the secondary locking member comprises axial splines oriented substantially parallel to the axis of rotation of the fastener component, which project radially from the engagement surface with respect to the axis of rotation of the fastener component. Optionally, a corresponding engagement surface of the other one of the locking member and the secondary locking member comprises axial recesses configured to receive the splines, so that the splines and recesses interlock to prevent relative rotation of the locking member and the secondary locking member when the secondary locking member is engaged with the locking member.

Optionally, the fastener component is a nut and the further fastener component is a stud threadingly engaged with the nut.

A second aspect of the invention provides an assembly. The assembly comprises a first structure; a second structure; a fastener fixedly attaching the first structure to the second structure; and a locking apparatus engaged with the fastener and at least one of the first structure and the second structure. The locking apparatus is for substantially preventing rotation of at least a part of the fastener relative to the at least one of the first structure and the second structure. The locking apparatus comprises a rigid locking member having a first end fixedly attached to the fastener, and a second end fixedly attached to the at least one of the first structure and the second structure.

Optionally, the fastener comprises a first fastener component threadingly engaged with a second fastener component and the first end of the locking member is fixedly attached to the first fastener component, and the locking apparatus further comprises a rigid secondary locking member having a first part fixedly attached to the locking member and a second part fixedly attached to the second fastener component.

Optionally, the locking apparatus is a locking apparatus according to the first aspect.

A third aspect of the invention provides an aircraft comprising the assembly according to the second aspect.

A fourth aspect of the invention provides a method of locking the rotational position of a rotatable fastener component. The method comprises:

provided a fastener connected to at least one structure;

providing a rigid locking member configured to engage with a rotatable component of the fastener, wherein the locking member comprises an arm having a first end engageable with the rotatable component and a second end engageable with the at least one structure;

engaging the first end of the locking member with the rotatable component such that rotation of the locking member relative to the rotatable component is substantially prevented, and such that the arm extends toward the at least one structure; and engaging the second end of the locking member with the at least one structure, such that rotation of the locking member relative to the at least one structure is substantially prevented.

Optionally, engaging the first end of the locking member with the rotatable component comprises selecting a rotational position of the locking member relative to the rotatable component, and engaging the first end with the rotatable component in the selected rotational position.

Optionally, the first end of the locking member and the rotatable component are mutually configured such that the first end of the locking member is engageable with the rotatable component in a first set of rotational positions, and the selected rotational position is comprised in the first set of rotational positions.

Optionally, the method further comprises providing an engagement feature on the at least one structure, and wherein the selected rotational position of the locking member is a position in which the second end of the locking member is aligned with the engagement feature.

Optionally, the engagement feature and the second end of the locking member are mutually configured such that the second end of the locking member is alignable with the engagement feature in a second set of rotational positions of the locking member relative to the structure, and selecting a rotational position of the locking member relative to the rotatable component comprises selecting a rotational position comprised in both the first set of rotational positions and the second set of rotational positions.

Optionally, the method further comprises:

providing a secondary locking member configured to engage with a further rotatable component of the fastener, and with the locking member;

engaging the secondary locking member with the further rotatable component such that rotation of the secondary locking member relative to the further rotatable component is substantially prevented; and engaging the secondary locking member with the locking member, such that rotation of the secondary locking member relative to the locking member is substantially prevented.

Optionally, engaging the secondary locking member with the further rotatable component comprises selecting a rotational position of the secondary locking member relative to the further rotatable component, and engaging the secondary locking member with the further rotatable component in the selected rotational position.

Optionally, the secondary locking member and the further rotatable component are mutually configured such that the secondary locking member is engageable with the further rotatable component in a first set of rotational positions of the secondary locking member relative to the further rotatable component, and the selected rotational position is comprised in the first set of rotational positions of the secondary locking member relative to the further rotatable component.

Optionally, the secondary locking member and the locking member are mutually configured such that the secondary locking member is engageable with the locking member in a second set of rotational positions of the secondary locking member relative to the further rotatable component, and wherein selecting a rotational position of the secondary locking member relative to the further rotatable component comprises selecting a rotational position comprised in both the first set and the second set of rotational positions of the secondary locking member relative to the further rotatable component.

BRIEF DESCRIPTION OF THE DRAWINGS

Embodiments of the invention will now be described, by way of example only, with reference to the accompanying drawings, in which:

FIG. 4b is an exploded view of a fastener and locking apparatus comprised in the example assembly of FIG. 4a;

DETAILED DESCRIPTION

The examples described below relate to locking the rotational position of a fastener component which is rotatable about an axis relative to a structure. In each described example the locking is facilitated by a locking apparatus, comprising a rigid locking member. The example locking members described herein each have a first end configured to engage with the fastener component such that rotation of the fastener component relative to the first end is substantially prevented, and a second end configured to engage with the structure such that rotation of the locking member relative to the structure is substantially prevented. In some examples the first end may be considered to be fixedly attached to the fastener component when it is engaged with the fastener component, and the second end may be considered to be fixedly attached to the structure when it is engaged with the structure. The term "fixedly attached" as used in this specification is intended to mean that relative movement between two fixedly attached components is substantially prevented by the attachment, and does not exclude attachments in which some small degree of relative movement remains possible (e.g. as a result of manufacturing tolerances of the components).

The invention may be particularly advantageous for applications in which the fastener to be locked is a two-part fastener, where both parts must be locked relative to a further structure; and/or in applications in which the fastener to be locked is particularly large and/or heavily loaded; and/or in applications in which the fastener to be locked is difficult to access; as will become apparent from the description below. Moreover; locking apparatus according to the invention may be very quick and simple to install, thus facilitating an efficient and cost-effective manufacturing process.

Figure 1:
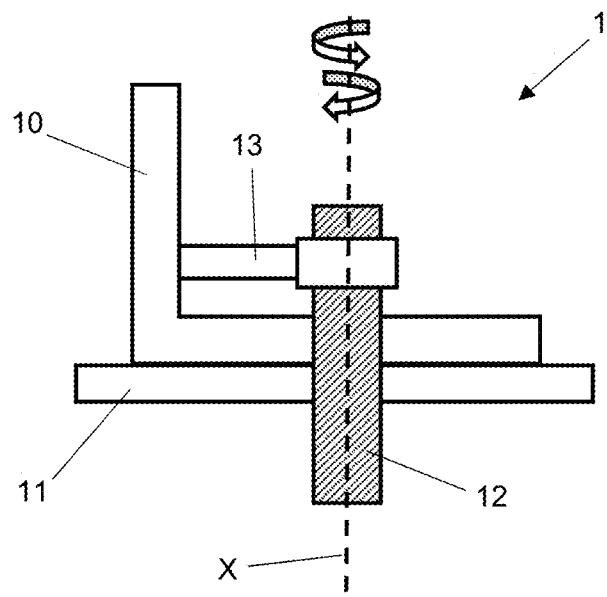
FIG. 1 is a schematic side view of an example assembly according to the invention, comprising a fastener component, a structure, and a locking apparatus for locking the rotational position of the fastener component relative to the structure.

FIG. 1 shows an example assembly 1 comprising a fastener 12 locked in accordance with the invention. The assembly 1 comprises a first structure 10 which is fixedly attached to a second structure 11 by the fastener 12. The assembly 1 also comprises a locking apparatus 13, which is engaged with the fastener 12 and the first structure 10, for substantially preventing rotation of at least a part of the fastener 12 relative to the first structure 10. In other examples the locking apparatus 13 may be engaged with the second structure 11 instead of the first structure 10, or may be engaged with both the first structure 10 and the second structure 11. The locking apparatus 13 comprises a rigid locking member having a first end configured to engage with the fastener 12 (or a component thereof) such that rotation of at least a part of the fastener (e.g. a component of the fastener with which the first end is engaged) relative to the first end is substantially prevented, and a second end configured to engage with the first structure such that rotation of the locking member relative to the first structure is substantially prevented. In FIGS. 1-3b, fasteners (and components thereof) are shown with hatching, to make it easier to distinguish which illustrated parts are comprised in a fastener and which are comprised in surrounding structures or a locking apparatus.

The first and second structures 10, 11 may be any type of structures joinable by the fastener 12. One or both of the first and second structures 10, 11 may be a metallic component. One or both of the first and second structures 10, 11 may be formed from a composite material. The first and second structures 10, 11 may be configured or located such that they are likely to be subjected to significant vibration during normal operation of the assembly 1, or of a vehicle in which the assembly 1 is comprised. In some examples the first and second structures 10, 11 are aircraft components.

The fastener 12 is configured to resist separation of the first and second structures 10, 11 in the direction parallel to the rotational axis X of the fastener. The fastener 12 may be further configured to resist relative movement of the first and second structures 10, 11, in directions perpendicular to the axis X. The fastener 12 may be any type of fastener which is tightened by rotating at least a part of the fastener 12 about the axis X. In some examples the fastener 12 is configured to be tightened by rotating one part of the fastener 12 relative to another part of the fastener 12. In some examples the fastener 12 is configured to be tightened by rotating at least a part of the fastener 12 relative to the first and second structures 10, 11. The fastener 12 may be a threaded fastener. The fastener 12 may comprise a nut and bolt, a tension stud, a screw, or the like.

At least a part of the fastener 12 has a finite order of rotational symmetry about the axis X. In other words, at least a part of the fastener 12 has a non-circular cross-section in a plane perpendicular to the axis X, and/or at least one radially-extending projection. This facilitates applying a torque to the fastener part having a finite order of rotational symmetry, for example to enable the fastener 12 to be tightened by rotating the fastener part (relative to the first and second structures 10, 11 and/or relative to another part of the fastener 12).

Figure 2:
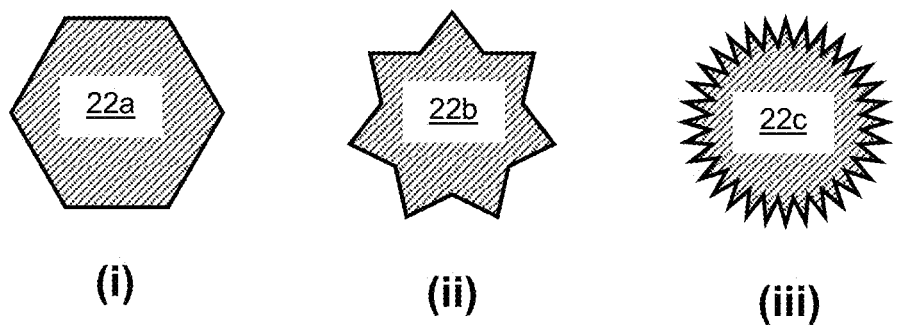
FIG. 2 is a top view of three different example fastener components for the assembly of FIG. 1.

FIG. 2 shows cross-sections through three different example fastener components 22a, 22b and 22c, any of which may form at least part of the fastener 12. Each of the fastener components 22a, 22b, 22c has a finite order of rotational symmetry about the axis X. In particular, the fastener component 22a has a regular hexagonal cross-section and rotational symmetry of order 6; the fastener component 22b has a star-shaped cross-section and rotational symmetry of order 7; and the fastener component 22c has a circular cross-section with 32 equally spaced radially-projecting splines and rotational symmetry of order 32. The splines are oriented substantially parallel to the axis of rotation of the fastener component 22c. Each of the splines may be considered to be a radially-extending projection. A part of the fastener 12 may equally have any other shape having a finite order of rotational symmetry. Preferably the order of rotational symmetry of the non-circular fastener part is at least 4. A higher order of rotational symmetry (e.g. at least 8) may be advantageous for many applications, as will be explained in more detail below.

The locking apparatus 13 comprises a locking member in the form of a rigid arm having a first end configured to engage with the fastener 12 and a second end configured to engage with the first structure 10. In some examples the first end comprises an engagement surface configured to mechanically interlock with an outer surface of the fastener 12, or a component thereof. The mechanical interlock prevents relative rotation, about the axis X, of the locking member and the part of the fastener 12 with which the first end is engaged. The mechanical interlock may be achieved by the engagement surface of the first end being shaped to conform to the outer surface of the fastener 12. For example, if the outer surface of the fastener 12 comprises one or more protrusions, the engagement surface may comprise one or more correspondingly shaped recesses in which the protrusions are received when the first end is engaged with the fastener 12. In some examples the first end is configured to at least partially encircle the fastener 12 (or a component thereof). In particular, the first end may be configured to at least partially encircle a section of the fastener 12 having a non-circular cross-section and/or at least one radially-extending projection.

In some examples the engagement surface is configured to mechanically interlock with the outer surface of the fastener 12 (or a component thereof) in a plurality of rotational positions of the fastener 12 (or a component thereof) relative to the locking member. The number of different relative rotational positions of the fastener 12 (or a component thereof) and the locking member in which the engagement surface and outer surfaces are able to be interlocked may be equal to the order of rotational symmetry of the part of the fastener 12 with which the first end is configured to engage. It is advantageous for the first end of the locking member to be engageable with the fastener 12 (or a component thereof) in various relative rotational positions of the locking member and fastener 12 (or component thereof) because it is often difficult or impossible to predict which rotational position the fastener component will be in after it has been tightened. As will be explained further below, it may be necessary for the locking member to be engaged with the fastener 12 in an orientation such that the second end of the locking member is adjacent the first structure 10 (in order for the second end to be able to engage with the first structure 10).

The second end of the locking member may be configured to engage with the first structure 10 by any suitable mechanism such that relative rotational movement, about an axis parallel to the axis X, of the locking member and the first structure is substantially prevented. For example, the second end of the locking member may be fixedly attached to the first structure using one or more fasteners, of any suitable type. Alternatively or additionally, the second end of the locking member may be configured to cooperate with an engagement feature provided on the first structure 10. In some examples the second end of the locking member is configured to mechanically interlock with an engagement feature provided on the first structure 10. In some examples the second end of the locking member is configured to be fixedly attachable to the first structure 10 in a plurality of rotational positions of the locking member relative to the first structure 10. This feature may be present and may be advantageous irrespective of whether the first end of the locking member is configured to be engageable with the fastener 12 in a plurality of relative rotational positions.

Figure 3A:
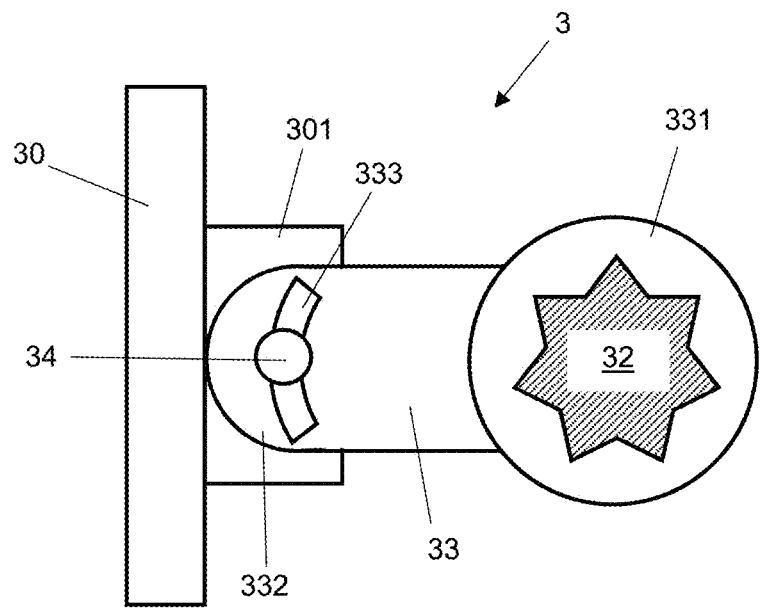
FIGS. 3a and 3b show top views of a further example assembly according to the invention.

FIG. 3a shows a top view of an example assembly 3 comprising a first structure 30, a second structure (not visible), a fastener component 32 and a locking apparatus, each of which may have the same features and functions as the corresponding parts of the assembly 1 described above. In FIG. 3a the locking apparatus is engaged with the fastener 32 and with the first structure 30, so that the fastener component 32 is unable to rotate relative to the first structure 30. A fastener in which the fastener component 32 is comprised is configured to be tightened by rotating the fastener component 32 about an axis normal to the plane of the page. The fastener component 32 has a star-shaped cross-section, with rotational symmetry of order 7. The locking apparatus comprises a locking member 33 in the form of a rigid arm having a first end 331 and a second end 332.

The first end 331 of the locking member 33 comprises a star-shaped hole shaped to match the cross-section of the fastener component 32, such that the fastener component 32 can be received within the hole. The first end 331 is thereby configured to encircle the fastener component 32 when the first end 331 is engaged with the fastener component 32. It will be appreciated that the points of the star can be considered to be radial projections, which are received within corresponding recesses in an engagement surface of the first end 331 when the first end is engaged with the fastener component 32. Relative rotational movement of the fastener component 32 and the locking member 33 is substantially prevented by a mechanical interlock created by the corresponding shapes of the fastener component 32 and the hole in the first end 331.

The first structure 30 comprises an engagement feature 301 and the second end 332 of the locking member 33 is configured to engage with the engagement feature 301. In this example the engagement feature 301 comprises a projection extending from a surface of the first structure 30 in a direction toward the fastener component 32 (or an intended location thereof, if the fastener component 32 is not yet installed). The engagement feature 301 includes a hole (not visible) to receive a locking fastener 34. The engagement feature 301 and the second end 332 of the locking member 33 are mutually configured such that relative rotational movement around an axis parallel to the rotational axis of the fastener component 32 is substantially prevented. In this example the rotational locking effect is achieved by shaping an engagement surface of the engagement feature 301 (the upper surface as shown in FIG. 3) and a corresponding engagement surface of the second end 332 (a lower surface of the second end 332, which is adjacent the upper surface of the engagement feature 301 in the engaged configuration shown in FIG. 3) such that they mechanically interlock. For example, one of the engagement surfaces may have projections configured to be received within recesses formed in the other engagement surface. The locking fastener 34 (which may be, for example, a screw, a bolt, or the like) is used to clamp the engagement surfaces against each other, to maintain the interlock.

An arcuate slot 333 is provided in the second end 332 of the locking member 33. The locking fastener 34 passes through this slot 333. The slot 333 is provided in place of a conventional fastener hole, to enable the second end 332 of the locking member 33 and the engagement feature 301 to be engaged in multiple relative rotational positions of the locking member 33 and the first structure 30. FIG. 3a shows the locking member 33 engaged with the engagement feature 301 such that the arm of the locking member 33 extends substantially perpendicularly away from the first structure 30.

Figure 3B:
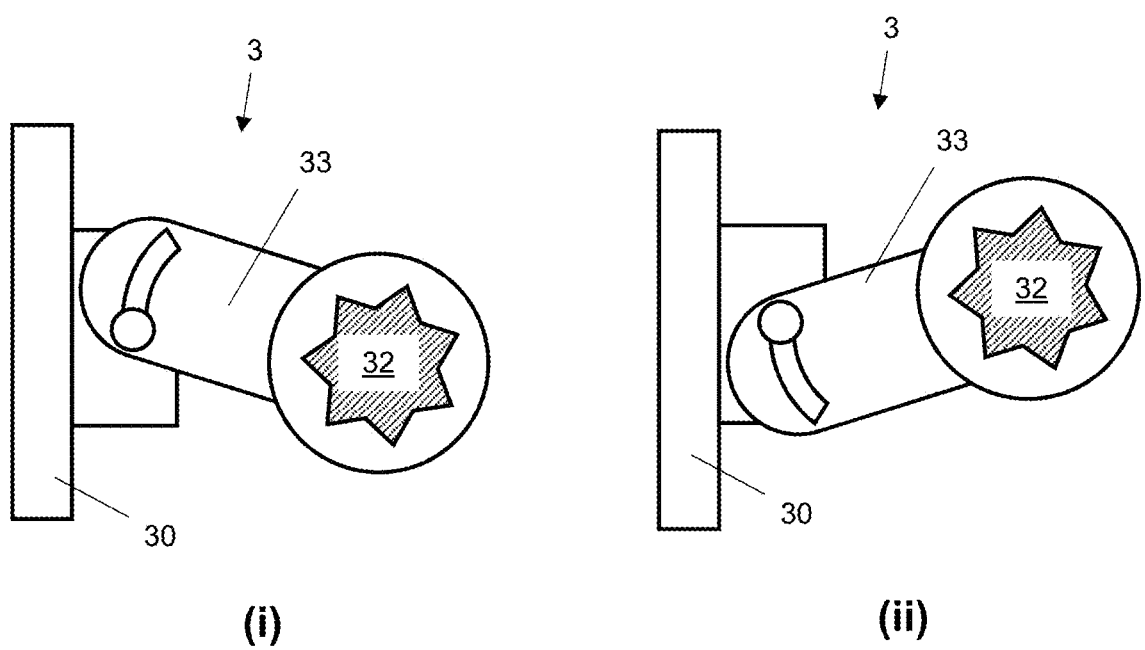

FIG. 3b shows two alternative engaged positions of the locking member 33. In part (i) the locking member 33 is rotated clockwise relative to its position in FIG. 3a. In part (ii) the locking member 33 is rotated anti-clockwise, by a similar amount, relative to its position in FIG. 3a. In each of the engaged positions of the locking member 33 shown in FIG. 3b, the first end 331 of the locking member 33 is engaged with the fastener component 32 such that rotational movement of the locking member 33 relative to the fastener component 32 is substantially prevented, and the second end 332 of the locking member 33 is engaged with the engagement feature 301 such that rotational movement of the locking member 33 relative to the first structure 30 is substantially prevented. The configuration shown in FIG. 3b(i) represents the maximum clockwise deviation from the FIG. 3a perpendicular configuration that is permitted by the slot 333, and the configuration shown in FIG. 3b(ii) represents the maximum anti-clockwise deviation from the FIG. 3a perpendicular configuration that is permitted by the slot 333. It will be appreciated that a longer slot would permit greater deviations.

The slot 333 therefore provides a mechanism by which the second end of the locking member 33 is able to be engaged with the first structure 30 in multiple relative orientations of the locking member 33 and the first structure 30. The surface configurations of the engagement surfaces of the second end and the engagement feature 301 are also designed such that they can mechanically interlock in multiple relative orientations of the locking member 33 and the first structure 30. This may be achieved, for example, by selecting appropriate shapes for projections and recesses provided on the engagement surfaces.

It is desirable for the second end of the locking member 33 to be engageable with the first structure 30 in multiple relative rotational positions of the locking member 33 and the first structure 30, for the following reasons. When the fastener comprising the component 32 is tightened by rotating the component 32, the fastener component 32 may end up in any possible rotational position relative to the first structure 30 (and it will generally be impossible to predict or control the rotational position of the fastener component 32 after tightening). However; the number of rotational positions in which the first end of the locking member 33 can be engaged with the fastener component 32 is limited, due to the fact that the fastener component 32 has a finite order of rotational symmetry. In many examples the number of rotational positions in which the first end of the locking member 33 can be engaged with the fastener component 32 is equal to the order of rotational symmetry of the fastener component 32.

In the particular example of FIGS. 3a and 3b, the first end of the locking member 33 can be engaged with the fastener component 32 in seven different relative rotational positions of the first end and the fastener component 32. These rotational positions are 51° apart. Thus, if the first end 331 is engageable with the fastener component 32 in a given relative rotational position of the fastener component 32 and the locking member 33, the first end 331 will also be engageable with the fastener component 32 if the locking member is rotated by 51° clockwise or anti-clockwise relative to the fastener component 32. This means that an optimum rotational position for engaging the second end 332 of the locking member 33 with the first structure 30, for a given rotational position of the fastener component 32, may fall anywhere within a 51° "first end engagement range". An optimum rotational position for engaging the second end of the locking member 33 with the fastener component 32 may be, for example, a rotational position in which the second end 332 is closest to an engagement feature 301 of the first structure 30, or in which the angle between the locking arm of the locking member 33 and the first structure 30 is closest to 90°. The size of the first end engagement range will get smaller as the number of rotational positions in which the first end 331 is engageable with the fastener component 32 increases, and this number in turn increases with the order or rotational symmetry of the fastener component 32. A relatively high order of rotational symmetry of the fastener component 32 is therefore advantageous, but may not be achievable in all situations (e.g. where it is desired to implement the invention with an off-the-shelf fastener).

The second end 332 of the locking member 33 is engageable with the engagement feature 301 of the first structure 30 in a range of relative rotational positions of the locking member 33, between the position shown in FIG. 3b(i) and the position shown in FIG. 3b(ii). The size of this "second end engagement range" is determined by the length of the arcuate slot 333, as mentioned above. The size of the second end engagement range may be at least equal to the angular separation between consecutive rotational positions of the locking member 33 in which the first end 331 is engageable with the fastener component 32 (i.e. the first end engagement range). In the illustrated example, the FIG. 3b(i) position and the FIG. 3b(ii) position are separated by 51°, so the size of the second end engagement range is 51° and is equal to the size of the first end engagement range.

Depending on the nature of the engagement between the second end 332 and the engagement feature 301, the second end 332 and the engagement feature 301 may be engageable in any relative rotational position falling within the second end engagement range, or may be engageable only in discrete relative rotational positions falling within the second end engagement range. For example, where the second end 332 and the engagement feature 301 engage by means of correspondingly shaped engagement surfaces, if those surfaces comprise regularly spaced projections and recesses, the second end 332 and the engagement feature 301 may only be engageable in rotational positions in which the projections on one of the engagement surfaces align with the recesses on the other engagement surface. In such examples, preferably the angular spacing (or separation) between the relative rotational positions of the locking member 33 and the first structure 30 in which the second end 332 is engageable with the first structure 30 is smaller than the angular spacing between the relative rotational positions of the locking member 33 and the fastener component 32 in which the first end 331 is engageable with the fastener component 32. Preferably the angular spacing between the relative rotational positions of the locking member 33 and the first structure 30 in which the second end 332 is engageable with the first structure 30 is sufficiently small that it will always be possible to engage the second end 332 with the first structure 30, in any possible relative rotational position of the locking member 33 and fastener component 32 falling within the second end engagement range.

Figure 4A:
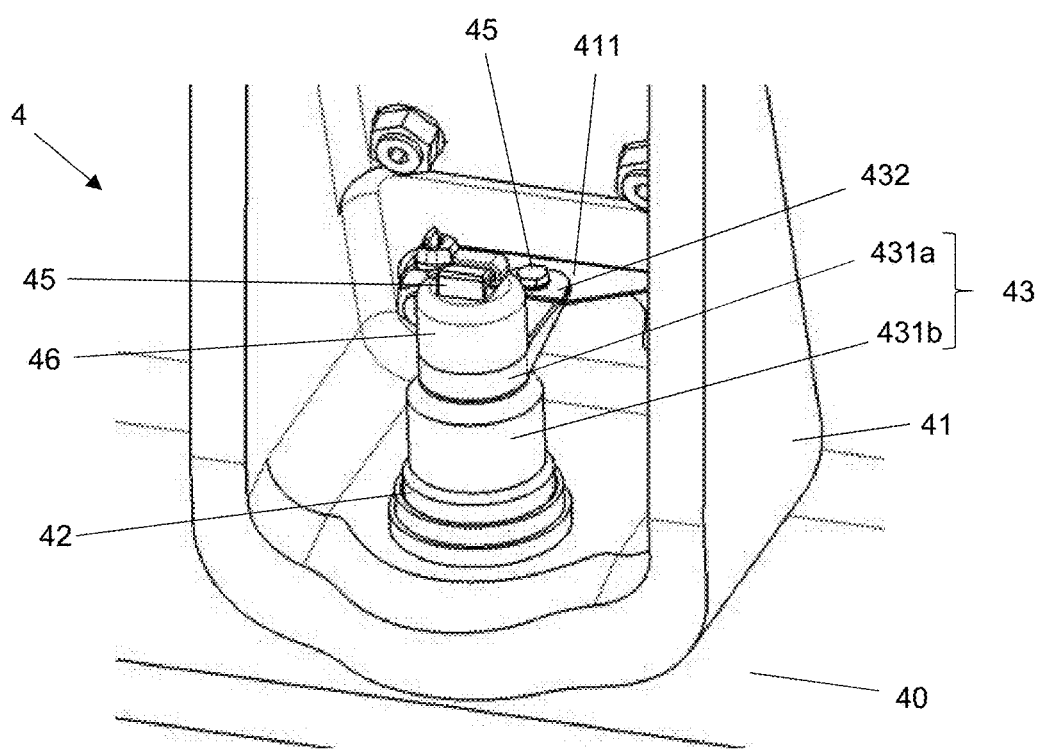
FIG. 4a is a perspective view of a yet further example assembly according to the invention.
Figure 4B:
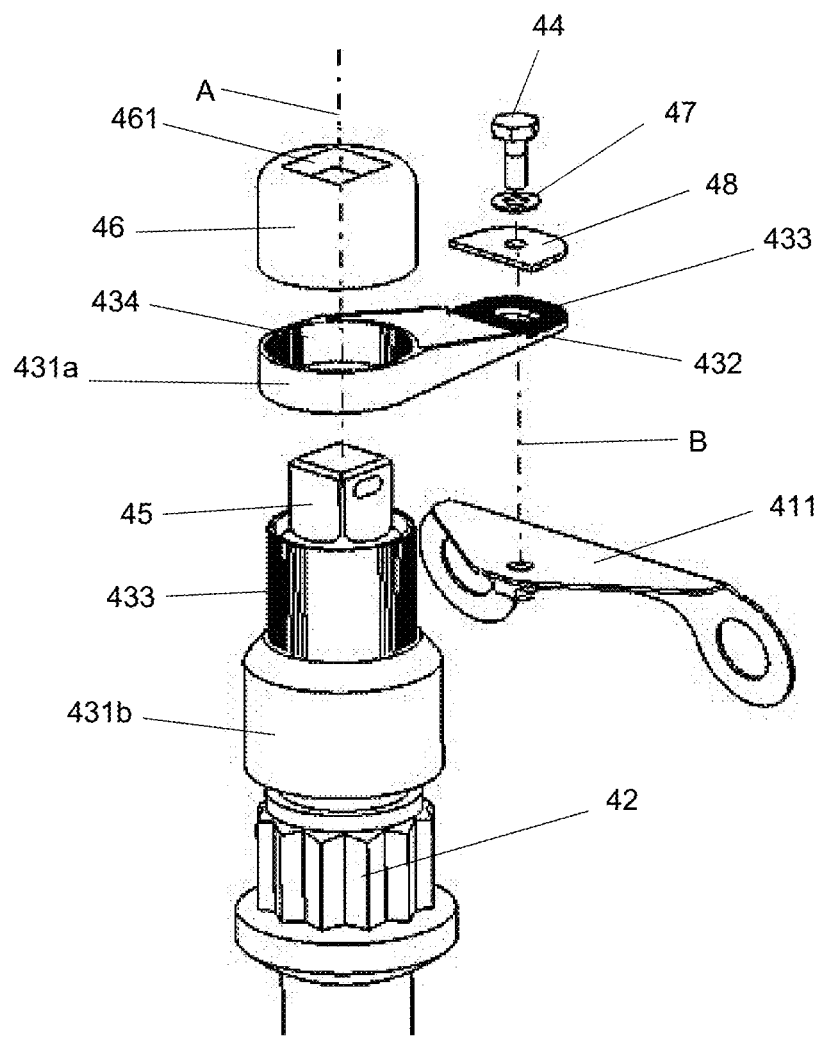

For some types of fastener which comprise two or more relatively rotatable components (e.g. a nut and a bolt) it may be necessary or desirable to lock the rotational position of more than one fastener component. FIGS. 4a and 4b show an assembly 4 comprising a fastener intended to facilitate one-sided (or "blind") installation of the fastener. The fastener comprises a stud 45 which screws (by rotation about the axis A) into a captive barrel nut (not visible) comprised in or fixedly attached to a first structure 40, and a nut 42 which screws (by rotation about the axis A) onto the stud 45 to resist separation, along the axial direction of the fastener (which in this example is parallel to the axis of rotation A of the stud 45 and the nut 42), of the first structure 40 and a second structure 41. Component parts of the assembly 4 which are also present in the example assemblies 1 and 3 described above may have the same features and functions as corresponding component parts of the assemblies 1 and 3.

The assembly 4 comprises a primary locking member 43 for locking the rotational position of the nut 42 relative to the second structure 41. The assembly 4 also comprises a secondary locking member 46 for locking the rotational position of the stud 45 (which is rotatable relative to the nut 42 and relative to the first structure 40) relative to the nut 42 and relative to the second structure 41. In general terms, the secondary locking member 46 comprises a first part configured to engage with the primary locking member 43 such that rotation of the secondary locking member 46 relative to the primary locking member 43 is substantially prevented; and a second part configured to engage with the stud 45 such that rotation of the stud 45 relative to the secondary locking member 46 is substantially prevented.

In the particular example of FIGS. 4a and 4b, the primary locking member 43 comprises two separable components: a nut cap 431b and a rigid locking arm 431a. The nut 42 has a cross-section with a finite order of rotational symmetry about the axis A, created by radially-extending projections provided on an outer circumferential surface of the nut 42. The nut cap 431b has an inner surface correspondingly shaped to this outer circumferential surface (i.e. it has recesses corresponding to the projections), so that the nut cap 431b fits snugly over the nut 42. When the nut cap 431b is so engaged with the nut 42, relative rotation of the nut cap 431b and the nut 42 is prevented by a mechanical interlock between the projections on the surface of the nut 42 and the corresponding recesses on the inner surface of the nut cap 431b. The nut cap 431b has a hole in its top surface, such that the stud 45 protrudes from the top of the nut cap 431b when the nut cap 431b is engaged with the nut 42.

The locking arm 431a has a first end in the form of a collar 434, configured to receive the nut cap 431b. An outer circumferential surface 433 of the nut cap 431b has a cross-section with a finite order of rotational symmetry about the axis A, created by radially-extending projections (in the form of splines oriented substantially parallel to the axis of rotation of the fastener component). The collar has an inner surface correspondingly shaped to this outer circumferential surface 433 (i.e. it has grooves corresponding to the splines), so that the collar fits snugly over the nut cap 431b. When the collar 434 is so engaged with the nut cap 431b, relative rotation of the collar 434 and the nut cap 431b is prevented by a mechanical interlock between the splines on the surface of the nut cap 431b and the corresponding grooves on the inner surface of the collar 434. The splined surface of the nut cap 431b is longer in the axial direction than the height (in the axial direction) of the collar 434, such that part of the splined outer surface of the nut cap 431b remains exposed when the collar 434 is engaged with the nut camp 431b.

The locking arm 431a has a second end 432 configured to engage with an engagement feature 411, which is fixedly attached to the second structure 41. The second end 432 is engageable with the engagement feature 411 by a similar mechanism to that described above in relation to FIGS. 3a and 3b. In particular, an engagement fastener 44 passes through a slot 433 in the second end 432 and screws (by rotation about the axis B) into a captive nut fixedly attached to the engagement feature 411, to firmly clamp the second end 432 against the engagement feature 411 and substantially prevent relative rotation thereof. In the particular example of FIGS. 4a and 4b, a plate 48 and a washer 47 are used to facilitate the engagement. The slot 433 creates a second end engagement range, as described above. Any two or more adjacent surfaces of the engagement feature 411, second end 432, and plate 48 may be configured to mechanically interlock, to facilitate the prevention of relative rotational movement of those adjacent surfaces. The mechanical interlock may be achieved, for example, in any of the manners described above in relation to any of the mechanical interlocks between other parts of the example locking apparatus.

The primary locking member 43 is configured to be in simultaneous engagement with the nut 42 and with the secondary locking member 46. The secondary locking member 46 comprises a stud cap, configured to engage with the stud 45 such that relative rotation of the stud 45 and stud cap 46 is substantially prevented. At least a part of the stud 45 with which the stud cap 46 is engageable has a cross-section with a finite order of rotational symmetry about the axis A (in the illustrated example, the top end of the stud 45 has a square cross-section). The stud cap 46 has a first inner surface 461 for engaging the stud 45. The first inner surface 461 is correspondingly shaped to the square cross-section of the stud cap 46 so that the stud cap 46 snugly receives the top end of the stud 45. The stud cap 46 further has a second inner surface (not visible) for engaging the nut cap 431b. The second inner surface is correspondingly shaped to the outer circumferential (splined) surface of the nut cap 431b so that the stud cap 46 snugly receives the top part of the nut cap 431b (i.e. the part not covered by the collar 434). In the particular example, the second inner surface has grooves corresponding to the splines on the outer surface of the nut cap 431b.

The stud cap 46 is thereby configured to be simultaneous engagement with the stud 45 and the nut cap 431b. When the stud cap 46 is so engaged, relative rotation of the stud cap 46 and the stud 45 is (at least substantially) prevented by a mechanical interlock between the square shape of the stud and the corresponding shape of the first inner surface 461, and relative rotation of the stud cap 46 and the nut cap 431b is (at least substantially) prevented by a mechanical interlock between the splines on the surface of the nut cap 431b and the corresponding grooves on the second inner surface of the stud cap 46. In the particular illustrated example the stud cap 46 has a hole in its top surface, such that the stud 45 protrudes from the top of the stud cap 46 when the stud cap 46 is engaged with the stud 46 and the nut cap 431b. This enables a split pin to be passed through the top of the stud, to prevent axial movement of the stud cap 46. Any other suitable mechanism for locking the axial position of the stud cap 46 could alternatively be used.

Figure 5:
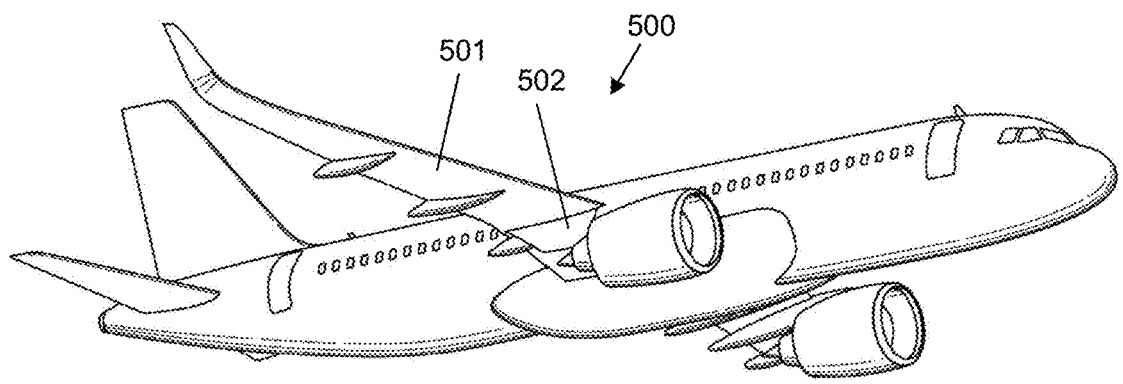
FIG. 5 is a schematic perspective view of an example aircraft comprising a locking apparatus according to the invention.

Locking apparatus according to the invention may advantageously be employed in the aerospace industry, e.g. to facilitate aircraft manufacture. FIG. 5 shows an example aircraft 500 which comprises one or more such locking apparatus. In particular, the aircraft comprises a wing 501, to which an engine mounting pylon 502 is attached. A structure of the engine mounting pylon 502 is attached to a structure of the wing 501 by a plurality of fasteners, at least some of which are rotationally locked by locking apparatus according to the invention, as will be described below with reference to FIG. 6. The attached structures, fasteners and locking apparatus together form assemblies according to the invention. The aircraft 500 also includes a further wing and engine mounting pylon, which may be attached in the same manner as the wing 501 and pylon 502.

Figure 6:
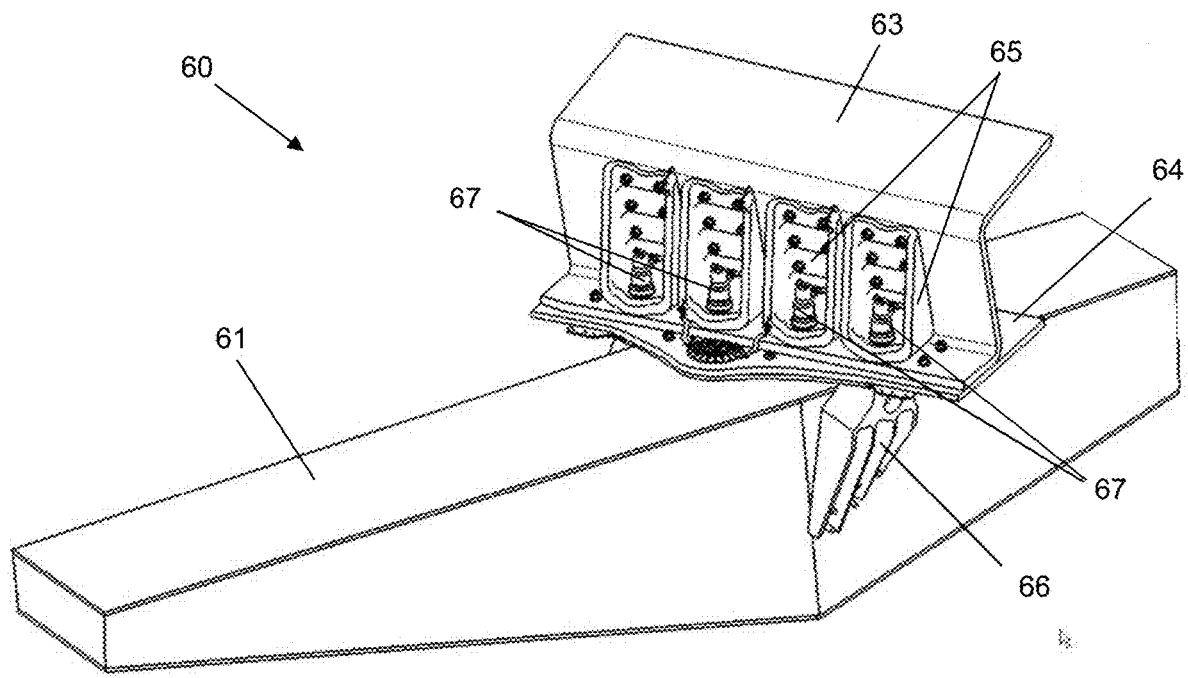
FIG. 6 is a schematic perspective view of an engine pylon-wing box joint comprised in the example aircraft of FIG. 5.

FIG. 6 shows an example assembly 60, which may be comprised in the wing 501 of the aircraft 500. The assembly 60 comprises a wing box having a spar 63 and a lower cover 64. The assembly 60 further comprises a structure 61 of an engine mounting pylon, which is attached to the wing box using fittings 65 and brackets 66. The assembly 60 permits the pylon structure 61 to be attached very close under the lower surface of the wing box and therefore facilitates a close-coupled engine arrangement.

Each fitting 65 has a substantially vertical face which lies adjacent to a substantially vertical face of the spar 63, and is attached thereto by a plurality of bolts. Each fitting 65 also has a substantially horizontal face which lies adjacent to a substantially horizontal face of the spar 63, to provide a load-bearing attachment structure from which the pylon can be hung. The main load path between the pylon structure 61 and the wing box structure is provided by four tension bolts 67, which pass through the horizontal faces of the fittings 65. It should be appreciated that the "horizontal" and "vertical" faces of the fittings 65 and the spar 63 are labelled as such merely for ease of reference. The horizontal and vertical faces of the fittings 65 are configured to lie adjacent to the corresponding horizontal and vertical faces of the spar 63, which need not be exactly perpendicular to each other, and neither face need be exactly horizontal or vertical with respect to the ground, or any other reference plane.

Each tension bolt 67 is of the same design as the example fastener of FIGS. 4a and 4b, and therefore comprises a rotatable stud and a rotatable nut, both of which must be locked to prevent loosening of the fastener during operation of the aircraft 500. The tension bolts 67 are relatively large and are configured to withstand large loads, so require a robust locking mechanism. A locking apparatus of the type illustrated by FIGS. 4a and 4b is engaged with each of the tension bolts 67, and with the associated fitting 65. The rotational positions of the studs and nuts of the tension bolts 67 are thereby locked relative to the fittings 65.

Figure 7:
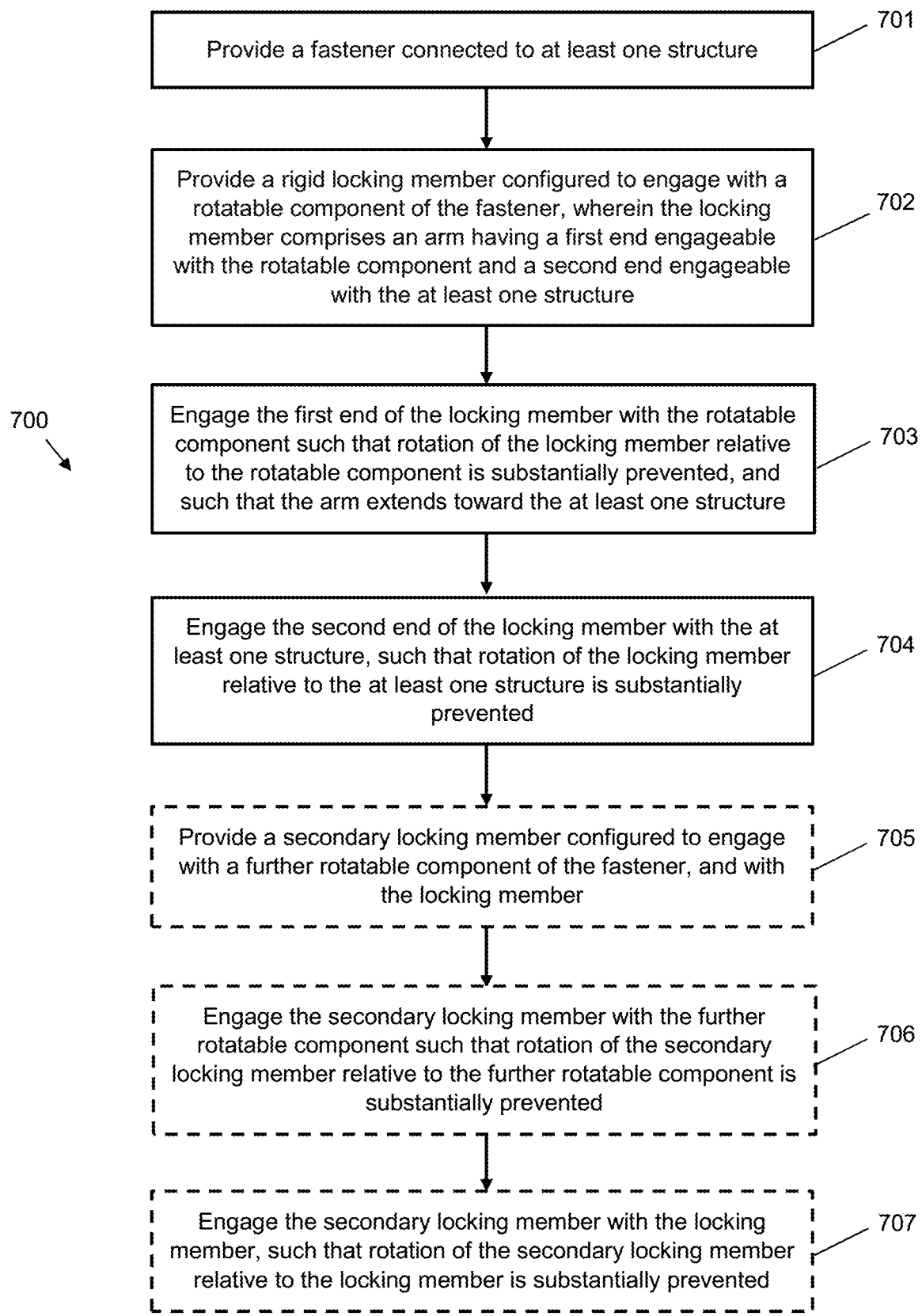
FIG. 7 is a flow chart illustrating an example method of locking the rotational position of a rotatable fastener component according to the invention.

FIG. 7 is a flow chart illustrating an example method 700 of locking the rotational position of a rotatable fastener component. The method 700 may be implemented using an example locking apparatus according to the invention, such as the example locking apparatus described above in relation to FIGS. 1 to 4b.

In the first block 701, a fastener is provided, connected to at least one structure. The fastener may be additionally connected to a further structure, and may be preventing separation of the at least one structure and the further structure. The fasteners may have been installed on the at least one structure in a conventional manner appropriate to the type of fastener. The fastener may have the features of any of the example fasteners described above. The at least one structure (and if present, the further structure) may have the features of any of the example structures described above. The at least one structure (and if present, the further structure) may be comprised by or in an aircraft component.

In block 702, a rigid locking member configured to engage with a rotatable component of the fastener is provided. The locking member comprises an arm having a first end engageable with the rotatable component and a second end engageable with the at least one structure. The locking member may have the features of any of the example locking members described above.

In block 703, the first end of the locking member is engaged with the rotatable component such that rotation of the locking member relative to the rotatable component is substantially prevented, and such that the arm extends toward the at least one structure. Engaging the first end of the locking member with the rotatable component may be performed in any of the manners described above in relation to the example locking members 13, 33, 43. Engaging the first end of the locking member with the rotatable component may comprise creating a mechanical interlock between the first end and the rotatable component. In some examples, engaging the first end with the rotatable component may comprise receiving at least a part of the rotatable component within a recess or opening formed in the first end.

Engaging the first end of the locking member with the rotatable component may comprise selecting a relative rotational position of the locking member and rotatable component. The first end may be engaged with the rotatable component in the selected relative rotational position. The relative rotational position may be selected from a range of relative rotational positions in which the arm extends toward the at least one structure. The arm may be considered to extend toward the at least one structure in any position of the arm in which the long axis of the arm, if extended out from the second end indefinitely, would intersect the at least one structure. Thus the arm need not extend directly toward the at least one structure in order to extend toward the at least one structure.

The first end of the locking member and the rotatable component may be mutually configured such that the first end of the locking member is engageable with the rotatable component in a first set of rotational positions, and performing block 703 may comprise selecting a relative rotational position comprised in the first set of rotational positions. Performing block 703 may comprise selecting a relative rotational position of the locking member and rotatable component in which the second end is engageable with an engagement feature on the at least one structure. For example, an engagement feature may be provided on the at least one structure, and the selected rotational position of the locking member may be a position in which the second end of the locking member is aligned with the engagement feature. In some examples the engagement feature and the second end of the locking member are mutually configured such that the second end of the locking member is alignable with the engagement feature in a second set of rotational positions of the locking member relative to the structure, and selecting a rotational position of the locking member relative to the rotatable component comprises selecting a rotational position comprised in both the first set of rotational positions and the second set of rotational positions.

In block 704, the second end of the locking member is engaged with the at least one structure, such that rotation of the locking member relative to the at least one structure is substantially prevented. Engaging the second end of the locking member with the at least one structure may be performed in any of the manners described above in relation to the example locking members 13, 33, 43. Engaging the second end of the locking member with the at least one structure may comprise engaging the second end with an engagement feature on the at least one structure. Engaging the second end of the locking member with the at least one structure may comprise fixedly attaching the second end of the locking member to the at least one structure. Engaging the second end of the locking member with the at least one structure may comprise creating a mechanical interlock between the second end and the at least one structure (or an engagement feature comprised therein).

In an optional block 705, a secondary locking member is provided, which is configured to engage with a further rotatable component of the fastener, and with the locking member. The secondary locking member may have the features of any of the example secondary locking members described above. The further rotatable component may have the features of any of the example rotatable fastener components described above. The further rotatable component may be of a different type to the rotatable component. The further rotatable component may be threadingly engaged with the rotatable component.

In a further optional block 706, the secondary locking member is engaged with the further rotatable component such that rotation of the secondary locking member relative to the further rotatable component is substantially prevented. The secondary locking member may be engaged with the further rotatable component in any of the manners described above in relation to the example secondary locking member 46. Engaging the secondary locking member with the further rotatable component may comprise creating a mechanical interlock between the secondary locking member and the further rotatable component. In some examples, engaging the secondary locking member with the further rotatable component may comprise receiving at least a part of the further rotatable component within a recess or opening formed in the secondary locking member.

Engaging the secondary locking member with the further rotatable component may comprise selecting a relative rotational position of the secondary locking member and further rotatable component, and engaging the secondary locking member with the further rotatable component in the selected rotational position. Performing block 703 may comprise selecting a relative rotational position of the secondary locking member and further rotatable component in which the secondary locking member is engageable with the locking member. In some examples the secondary locking member and the further rotatable component are mutually configured such that the secondary locking member is engageable with the further rotatable component in a first set of rotational positions of the secondary locking member relative to the further rotatable component, and the selected rotational position is comprised in the first set of rotational positions of the secondary locking member relative to the further rotatable component. The secondary locking member and the locking member may be mutually configured such that the secondary locking member is engageable with the locking member in a second set of rotational positions of the secondary locking member relative to the further rotatable component, and selecting a rotational position of the secondary locking member relative to the further rotatable component may comprise selecting a rotational position comprised in both the first set and the second set of rotational positions of the secondary locking member relative to the further rotatable component.

Block 706 may be performed after blocks 701-704.

In a further optional block 707 the secondary locking member is engaged with the locking member, such that rotation of the secondary locking member relative to the locking member is substantially prevented. Engaging the secondary locking member with the locking member may be performed in any of the manners described above in relation to the example secondary locking members 46. Engaging the secondary locking member with the locking member may comprise creating a mechanical interlock between the secondary locking member and the locking member. In some examples block 707 may be performed simultaneously with block 706.

The structure may be joined to a further structure by multiple fasteners. In such cases the method 700 may be performed in respect of a subset of the multiple fasteners, or in respect of each of the multiple fasteners. The method 700 may be performed sequentially, simultaneously, or a combination of both sequentially and simultaneously, until all fasteners joining the structure to the further structure have been rotationally locked.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A locking apparatus for locking a rotational position of a fastener component which is rotatable about an axis relative to a structure; the locking apparatus comprising:
   a rigid locking member having a first end configured to engage with the fastener component such that rotation of the fastener component relative to the first end is substantially prevented, and a second end configured to engage with the structure such that rotation of the locking member relative to the structure is substantially prevented and
   a rigid secondary locking member configured to lock a rotational position of a further fastener component which is rotatable about the axis relative to the fastener component, the secondary locking member comprising:
      a first part configured to engage with the rigid locking member such that rotation of the secondary locking member relative to the locking member is suppressed; and
      a second part configured to engage with the further fastener component such that rotation of the further fastener component relative to the secondary locking member is suppressed.

2. The locking apparatus according to claim 1, wherein the fastener component comprises at least a part of a fastener for fastening the structure to a further structure and has a finite order of rotational symmetry about the axis.

3. The locking apparatus according to claim 1, wherein the first end comprises an engagement surface configured to mechanically interlock with an outer surface of the fastener component in a plurality of rotational positions of the fastener component relative to the locking member.

4. The locking apparatus according to claim 1, wherein at least a section of the fastener component has a non-circular cross-section and/or at least one radially-extending projection, and wherein the first end is configured to at least partially encircle a section of the fastener component having a non-circular cross-section and/or at least one radially-extending projection.

5. The locking apparatus according to claim 1, wherein the second end is configured to be fixedly attachable to the structure in a plurality of rotational positions of the locking member relative to the structure.

6. The locking apparatus according to claim 1, wherein the locking member is configured to be in simultaneous engagement with the fastener component and with the secondary locking member.

7. The locking apparatus according to claim 1, wherein an engagement surface of one of the locking member and the secondary locking member comprises axial splines oriented substantially parallel to the axis of rotation of the fastener component, which project radially from the engagement surface with respect to the axis of rotation of the fastener component, and a corresponding engagement surface of the other one of the locking member and the secondary locking member comprises axial recesses configured to receive the splines, so that the splines and recesses interlock to prevent relative rotation of the locking member and the secondary locking member when the secondary locking member is engaged with the locking member.

8. The locking apparatus according to claim 1, wherein the fastener component is a nut and the further fastener component is a stud threadingly engaged with the nut.

9. The locking apparatus of claim 1, wherein the first part and the second part of the rigid secondary locking member have a common axis coaxial with the axis of the fastener component.

10. The locking apparatus of claim 9, wherein the rigid secondary locking member is a stud cap including an aperture, and the aperture includes a first surface forming the first part of the rigid secondary locking member and a second surface forming the second part.

11. An assembly comprising:
    a first structure;
    a second structure;
    a fastener fixedly attaching the first structure to the second structure, wherein the fastener comprises a first fastener component threadingly engaged with a second fastener component; and
    a locking apparatus engaged with the fastener and at least one of the first structure and the second structure, wherein the locking apparatus is configured to suppress rotation of at least a part of the fastener relative to the at least one of the first structure and the second structure;
    wherein the locking apparatus comprises:
       a rigid locking member having a first end fixedly attached to the first fastener component, and a second end fixedly attached to the at least one of the first structure and the second structure and
       a rigid secondary locking member including a first part fixedly attached to the locking member and a second part fixedly attached to the second fastener component.

12. An aircraft comprising the assembly according to claim 11.

13. A method of locking the rotational position of a rotatable fastener component, the method comprising:
providing a fastener connected to at least one structure;
providing a rigid locking member configured to engage with a rotatable component of the fastener, wherein the locking member comprises an arm having a first end engageable with the rotatable component and a second end engageable with the at least one structure;
engaging the first end of the locking member with the rotatable component such that rotation of the locking member relative to the rotatable component is suppressed, and such that the arm extends toward the at least one structure;
engaging the second end of the locking member with the at least one structure, such that rotation of the locking member relative to the at least one structure is suppressed;
providing a rigid secondary locking member configured to engage with a further rotatable component of the fastener, and with the locking member;
engaging the rigid secondary locking member with the further rotatable component such that rotation of the rigid secondary locking member relative to the further rotatable component is suppressed; and
engaging the rigid secondary locking member with the locking member, such that rotation of the rigid secondary locking member relative to the locking member is suppressed.

14. The method according to claim 13,
wherein engaging the first end of the locking member with the rotatable component comprises selecting a rotational position of the locking member relative to the rotatable component, and engaging the first end with the rotatable component in the selected rotational position and
wherein engaging the secondary locking member with the further rotatable component comprises selecting a rotational position of the secondary locking member relative to the further rotatable component, and engaging the secondary locking member with the further rotatable component in the selected rotational position.

15. The method according to claim 14, wherein the first end of the locking member and the rotatable component are mutually configured such that the first end of the locking member is engageable with the rotatable component in a first set of rotational positions, and wherein the selected rotational position is comprised in the first set of rotational positions.

16. The method according to claim 14, wherein the method further comprises providing an engagement feature on the at least one structure, and wherein the selected rotational position of the locking member is a position in which the second end of the locking member is aligned with the engagement feature.

17. The method according to claim 16, wherein the engagement feature and the second end of the locking member are mutually configured such that the second end of the locking member is alignable with the engagement feature in a second set of rotational positions of the locking member relative to the structure, and wherein selecting a rotational position of the locking member relative to the rotatable component comprises selecting a rotational position comprised in both the first set of rotational positions and the second set of rotational positions.

18. The method according to claim 17, wherein the secondary locking member and the further rotatable component are mutually configured such that the secondary locking member is engageable with the further rotatable component in a first set of rotational positions of the secondary locking member relative to the further rotatable component, and wherein the selected rotational position is comprised in the first set of rotational positions of the secondary locking member relative to the further rotatable component.

19. The method according to claim 18, wherein the secondary locking member and the locking member are mutually configured such that the secondary locking member is engageable with the locking member in a second set of rotational positions of the secondary locking member relative to the further rotatable component, and wherein selecting a rotational position of the secondary locking member relative to the further rotatable component comprises selecting a rotational position comprised in both the first set and the second set of rotational positions of the secondary locking member relative to the further rotatable component.

* * * * *